May 19, 1964 M. W. LUTHER 3,133,436
APPARATUS FOR MEASURING DISTILLATION POINT OF A LIQUID STREAM
Filed May 10, 1961 5 Sheets-Sheet 4

Fig. 8

INVENTOR.
MARTIN W. LUTHER
BY
ATTORNEY

United States Patent Office 3,133,436
Patented May 19, 1964

3,133,436
APPARATUS FOR MEASURING DISTILLATION POINT OF A LIQUID STREAM
Martin W. Luther, Glen Mills, Pa., assignor to Sun Oil Company, Philadelphia, Pa., a corporation of New Jersey
Filed May 10, 1961, Ser. No. 109,049
18 Claims. (Cl. 73—17)

This invention relates to liquid stream analyzing apparatus, and more particularly to apparatus for continuously measuring one or more (for example, three) selected distillation points of a liquid stream, all of such selected distillaiton points being measured simultaneously. In accordance with common usage in the art to which this invention relates, the terms "distillation point" and "distillation points" have the same significance as the terms "boiling point" and "boiling points," respectively.

The analyzing apparatus of this invention is particularly useful for determining and recording continuously one or more boiling points of a liquid hydrocarbon stream. In a petroleum refinery, continuous indication of boiling point permits closer control of distillation columns, by providing the still operator with immediate notice of deviations from the desired properties in the various streams. The temperature readings obtained with the apparatus of this invention correlate with those obtained by a so-called "Engler distillation" in the laboratory, which latter (a batch-wise procedure) is performed in accordance with a method (D–86) laid down by the American Society for Testing Materials (ASTM).

An object of this invention is to provide a novel continuous distillation analyzer.

Another object is to provide a continuous distillation analyzer having a plurality or succession of stages, in which analyzer essentially all of the sample stream is distilled.

A further object is to provide a distillation analyzer by means of which a plurality of distillation points of a sample stream may be measured and recorded simultaneously.

An additional object is to provide a distillation analyzer by means of which a plurality of selected distillation points of a sample stream may be measured simultaneously, the analyzer having incorporated therein a convenient and effective arrangement for selecting a particular distillation point for measurement.

The objects of this invention are accomplished, briefly, in the following manner: The stream to be analyzed is fed at a constant, preset or predetermined rate, into the top of a heated metal tube provided with a multiplicity of vertically-spaced internal fins serving as plates, the arrangement being such that the liquid can contact these plates one at a time, in succession. As the liquid passes down over these plate members, it is heated, and distillation takes place, the vapors passing out of the tube by way of a longitudinal slot therein and condensing on the relatively cool internal wall of a glass pipe which surrounds but is spaced from the metal tube. The small amount of liquid residue which flows off the lowermost plate passes out through the bottom of the metal tube to a drop counter, which latter operates (via a controller) to control the heat input to the metal tube in such a way as to maintain a substantially constant drop (residue) rate. The distillate flows down the wall of the surrounding glass pipe and leaves the apparatus through a waste connection at the bottom thereof. Several (for example, three) thermocouple probes are located within the glass tube, in registry with the slot in the metal tube, these probes being individually mounted for sliding movement, longitudinally with respect to the metal tube, so as to sense the vapor temperature at any particular, selected tray. The leads from these thermocouples are connected to a multipoint temperature recorder. Summarizing the foregoing, the apparatus of this invention distills essentially all of the sample stream in a succession of stages and employs movable probes to select one or more stages at particular temperatures which are equivalent to ASTM distillation points.

A detailed description of the invention follows, taken in conjunction with the accompanying drawings, wherein.

Figure 1:
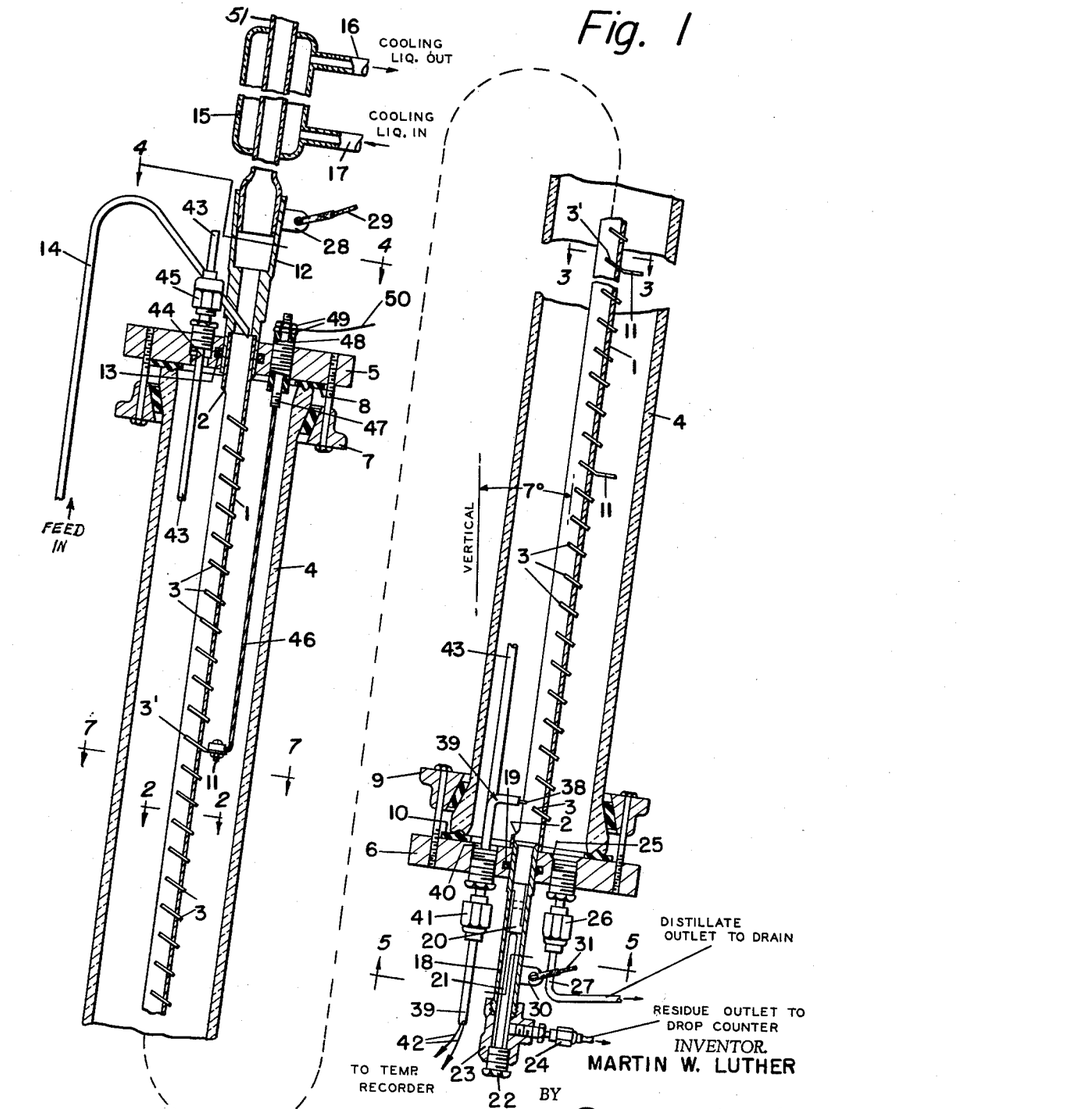
FIG. 1 (split into two parts) is a longitudinal section through the distillation vessel per se.

Now referring to the drawings, and particularly to FIG. 1 thereof, the heart of the device comprises an elongated thin-walled (.010-inch wall thickness, for example) stainless steel tube 1. By way of example, this tube may have an overall length of 24 13/16 inches and an O.D. of one-half inch. A longitudinally-extending slot 2 is cut into tube 1, this slot extending continuously from a point about one inch from one end of tube 1 to a point about three-sixteenths inch from the other end of this tube. This slot may conveniently have a depth of one-sixteenth inch, measured along the diameter of the tube, from the outer wall of the hollow cylindrical tube to the center line (between the two slot edges) of the slot.

Figure 2:
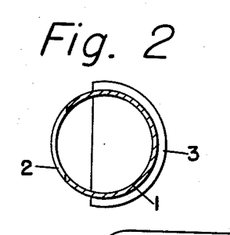
FIG. 2 is a partial transverse section taken along line 2—2 of FIG. 1.
Figure 3:
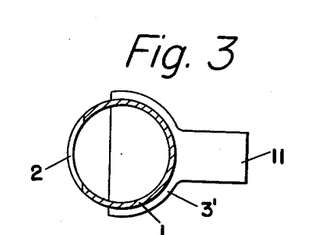
FIG. 3 is a partial transverse section taken along line 3—3 of FIG. 1.

A multiplicity (forty-six in number, for example) of narrow (.014-inch wide, for example) saw slots are cut into the wall of tube 1, at an angle of 67½° to the longitudinal axis of the tube, from the side of the tube diametrically opposite to slot 2. These saw slots are parallel to each other, are one-half inch apart, and have a depth of five-sixteenths inch, measured along the diameter of the tube 1, from the outer wall of the tube to the center line (between the two slot edges) of the saw slot. In each of the aforementioned saw slots, there is positioned a respective fin or plate member 3. The fins 3, which are formed from thin stainless steel flat stock, are brazed into the respective saw slots, so as to be rigidly secured therein and also to be in intimate thermal contact with the tube 1. Forty-three of the forty-six fins or plate members 3 are formed in the shape of the letter D (see FIG. 2), with the straight sides thereof extending across the tube 1 parallel to a diameter of this tube, and with the arcuate sides of the fins concentric with the wall of tube 1 outside the same, on the side of this tube opposite to slot 2. The length of the straight side of these fins may be nine-sixteenths inch, for example. The other three fins (for example, the twelfth, twenty-third, and thirty-fourth fins, counting from the upper end of the tube in FIG. 1), which are denoted by the numeral 3', are essentially of the same shape as fins 3 (see FIG. 3), but have in addition integral tabs 11 (one-fourth inch in width, for example) which extend rearwardly of tube 1 (considering slot 2 to be at the front of tube 1) a distance of about seven-sixteenths inch, to allow for connection of a separate electrical conductor to each of the fins 3', as will be described hereinafter.

In use, the tube 1 is positioned so that its longitudinal axis extends about 7° off the vertical, as illustrated in FIG. 1. The angularity of the fins 3, 3′ (which fins may be considered as extending more or less transversely of the tube 1), and the off-vertical positioning of the tube, are such that a liquid fed into the upper end of tube 1, in flowing downwardly through the tube, will contact the plate members or fins one at a time in succession, pausing on each plate before proceeding to the next lower one.

Figure 4:
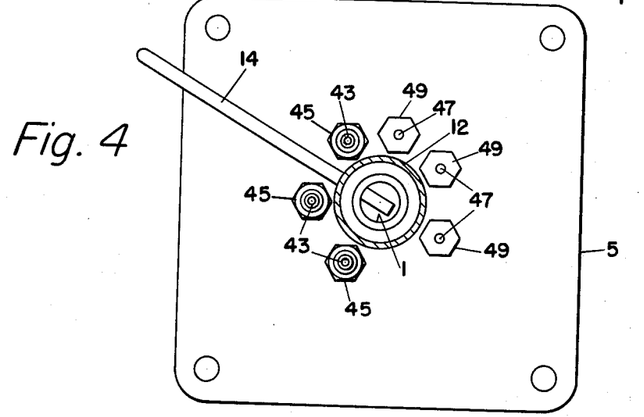
FIG. 4 is a transverse section taken along line 4—4 of FIG. 1.
Figure 5:
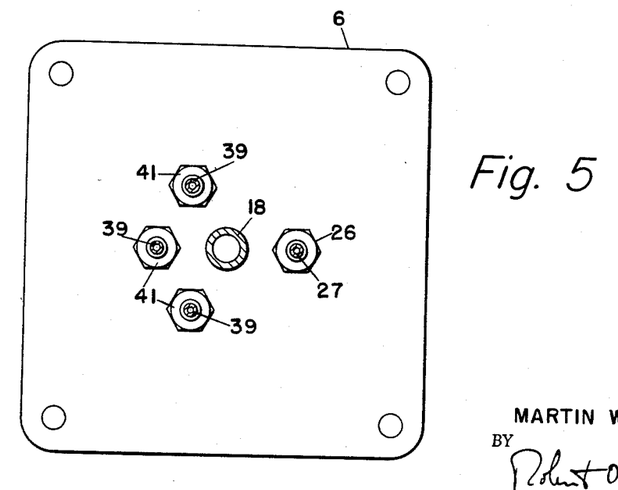
FIG. 5 is a transverse section taken along line 5—5 of FIG. 1.

The slotted tube 1 is mounted coaxially within a section 4 of glass pipe which has a flange 5 at one end and a flange 6 at its other end. Flanges 5 and 6 are substantially square in configuration, as illustrated in FIGS. 4 and 5, respectively. The upper end of pipe 4 is fastened to flange 5 by means of a mounting flange 7 which is similar in outer configuration to flange 5 and is bolted to flange 5 by means of four corner bolts (see FIG. 4). By way of example, these corner bolts pass freely through holes in flange 7 and thread into tapped holes in flange 5. Flange 7 has a tapered central aperture therein which surrounds and engages a tapered end portion provided on the upper end of pipe 4. A suitable annular gasket 8 may be inserted between the upper end of pipe 4 and the adjacent face of flange 5. Similarly, the lower end of pipe 4 is fastened to flange 6 by means of a mounting flange 9 which is similar in outer configuration to flange 6 and is bolted to flange 6 by means of four corner bolts (see FIG. 5). By way of example, these corner bolts pass freely through holes in flange 9 and thread into tapped holes in flange 6. Flange 9 has a tapered central aperture therein which surrounds and engages a tapered end portion provided on the lower end of pipe 4. A suitable annular gasket 10 may be inserted between the lower end of pipe 4 and the adjacent face of flange 6.

A metallic extension or coupling tube 12 (made, for example, of stainless steel) is secured as by brazing to the outside of tube 1, at the upper end thereof. A central aperture is provided in flange 5, in which aperture extension tube 12 fits rather tightly, tube 12 extending upwardly through this aperture. The arrangement is such that flange 5 engages the outer wall of tube 12 in the region of the joint between tubes 12 and 1. In this way, the upper end of tube 1 is maintained in position within pipe 4. The joint between flange 5 and tube assembly 12, 1 is sealed by means of a high-temperature O-ring 13 which is mounted in a recess in flange 5 and which seals against the outer wall of tube 12.

A sample or feed conduit 14, of stainless steel, for example, is sealed (as by brazing) through the wall of extension tube 12, above flange 5. Conduit 14 extends through tube 12 at an angle such as to bring the inner end of this conduit to a point adjacent the upper end of tube 1, at the back of this tube (that is to say, at the side thereof opposite to slot 2). The inner end of conduit 14 terminates within tube 1 but spaced from the inner wall thereof, with the plane of the inner end of this conduit extending substantially parallel to the longitudinal axis of tube 1. As will be described further hereinafter, the liquid sample to be analyzed is fed at a constant, preset rate through conduit 14 to the tube 1.

The metallic extension tube 1 (in a region above the point of entry of conduit 14 into this tube) is provided with a tapered (frusto-conical) upper end, into which fits the similarly-tapered lower end of a glass tube 51 which is open to the atmosphere at its upper end. Tube 51 is surrounded by a glass jacket 15, through which a cooling fluid (e.g., water) is circulated, by means of the hose couplings 16 and 17 provided at the upper and lower ends, respectively, of the jacket 15.

A metallic drain or outlet tube 18, serving as a residue drain tube, is secured as by brazing to the inner wall of tube 1, at the bottom end thereof. Tube 18 passes through a central aperture provided in flange 6, in which aperture tube 18 fits rather tightly; tube 18 extends downwardly through such flange aperture. In this way, the lower end of tube 1 is maintained in position within pipe 4. The joint between flange 6 and tube 18 is sealed by means of a high-temperature O-ring 19 which is mounted in a recess in flange 6 and which seals against the outer wall of tube 18.

A sealing member 20 is mounted in tube 18, below flange 6. Member 20 has therein several intercommunicating passages of small transverse dimensions, which become and remain filled with liquid during the operation of the device, thereby to provide a vapor seal. Member 20 rests on the upper end of a rod 21 whose opposite end is secured to a plug 22 which is threaded into one arm of a T-fitting 23, the opposite arm of this fitting being threadedly fastened to the lower end of tube 18. The remaining arm of the T-fitting 23 has threaded therein a tubing connector 24, to which is connected a residue outlet conduit which is indicated by a suitable legend in FIG. 1. This residue outlet conduit extends to a drop counter which forms part of a control system, to be described further hereinafter. Any liquid residue which enters the upper end of tube 18 passes through the vapor seal 20 and enters the drop counter by way of connector 24.

An aperture 25 is provided in flange 6, this aperture being located in the annular area between the outside of tube 1 and the inner wall of pipe 4. A tubing connector 26 is sealed into aperture 25, and a distillate outlet conduit 27 is coupled to connector 26. The distillate outlet conduit 27 extends to a suitable drain or slop connection. Any distillate (condensate) which enters aperture 25 passes to the drain via conduit 27.

A metal clip 28 is fastened to extension tube 12, above flange 5, in such a way as to make good electrical contact with this tube. A suitable electrical conductor or cable 29 is connected to clip 28, to serve as an electrical connection to the top end of tube 1. A metal clip 30 is fastened to drain tube 18, below flange 6, in such a way as to make good electrical contact with this tube. A suitable electrical conductor or cable 31 is connected to clip 30, to serve as an electrical connection to the bottom end of tube 1.

Figure 6:
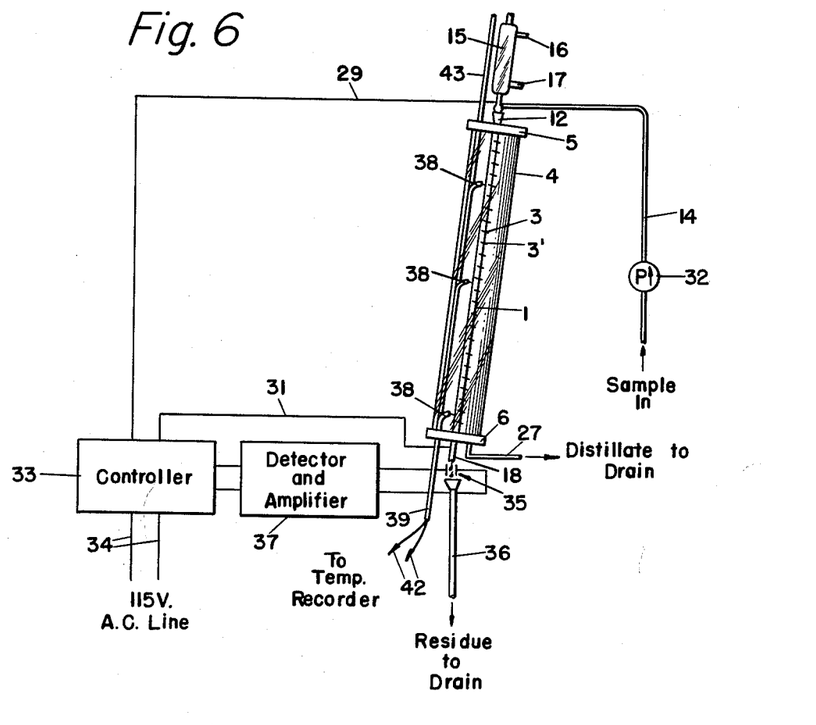
FIG. 6 is a schematic representation of the vessel of FIG. 1, as set up for use with auxiliary apparatus.

Reference will now be made to FIG. 6, which is a schematic representation of a complete analyzing apparatus according to this invention, as set up for use. In use, the assembly of metal tube and enclosing glass pipe (which assembly is illustrated in FIG. 1) is inclined about 7° from the vertical, as illustrated in FIG. 6, the inclination being such that slot 2 is on the left-hand side of tube 1 in this latter figure, and such that the fins 3 lie at an inclination (from front to rear of these fins) of 29½° below the horizontal, the slotted side of tube 1 again being considered as the front thereof. For purposes of simplicity, FIG. 6 does not show all of the fins. Sample is fed into the upper end of tube 1 (by way of feed conduit 14) by means of a positive displacement pump 32 which is adjusted to provide the prescribed rate of flow. Pump 32 may be a gear pump, of the type known as a "metering pump." During operation, pump 32 functions to feed the sample into tube 1 at a constant, preset, or predetermined rate.

The leads 29 and 31 (which are connected to the upper and lower ends, respectively, of tube 1) are connected to the output side of a controller 33 which has its input side connected by means of leads 34 to an alternating current power line. For the moment, controller 33 may be thought of as being simply a step-down transformer whose low-voltage secondary is connected between the ends of tube 1. Thus, a low voltage alternating current flows through the tube itself; the passage of this current through the tube heats it (and also the fins or plate members 3, 3′ thermally coupled thereto) to an elevated temperature. As a result, the heat required to distill the sample stream is supplied from the thin-walled tube 1.

Distillation of the sample progresses as the same flows down within the tube 1 from one stage or plate 3 to the next. Distillate vapor passes out of the tube 1 by way of slot 2, and condenses on the inner wall of the (cooler) glass pipe 4. The condensed distillate flows downwardly along such inner wall, and thence flows out of the device by way of aperture 25 (see FIG. 1) and the outlet conduit 27, to the distillate drain. The (undistilled) liquid residue, which flows off the lowermost fin or plate member 3 (to wit, the forty-sixth fin, counting from the top) passes through the vapor seal 20 located at the bottom of tube 1, and via tube 18 and connector 24 (see FIG. 1) enters a capacitive-type drop counter, denoted generally by numeral 35. Emerging from the drop counter 35, the residue enters a residue outlet conduit 36, which extends to a suitable drain or slop connection. Thus, the liquid residue, after passing through the drop counter, eventually reaches the drain.

The drop counter 35 per se forms no part of the present invention. Therefore, it will not be described in detail herein. By way of example, a drop counter of the type disclosed in the copending Donnell application, Serial No. 66,593, filed November 1, 1960, may be used at 35. Or, various other forms of capacitive-type drop counters may be used here.

The drop counter 35 is connected through a remote matching unit (not shown) to the input of a detector and amplifier unit 37, whose output is connected to the controller 33. Unit 37 applies to controller 33 a voltage which is proportional to the rate of flow of the residue (i.e., the drop rate) through drop counter 35. The controller 33 operates to control (e.g., by means of a saturable reactor whose controlled winding is connected between source leads 34 and output leads 29, 31) the voltage appearing between output leads 29 and 31 (and thereby also the current flowing through tube 1) in response to the output of detector and amplifier unit 37, and thus also in response to the rate of flow of residue through drop counter 35. The action is such that the voltage applied across tube 1 is so controlled as to produce a substantially constant drop rate through the (residue) drop counter 35. In this way, the voltage across the tube 1 (and thereby the current through this tube, and the temperature of the tube) is controlled in order to distill the sample stream to a constant residue rate corresponding to a prescribed percentage of distillate (the sample feed rate being preset and thus known).

The units 37 and 33 per se form no part of the present invention. Therefore, they will not be described in detail herein. A typical detection and control circuit which can be used here is disclosed in the copending Bachofer application, Serial No. 68,712, filed November 14, 1960.

Referring again to FIG. 1, the exterior surface of the glass pipe 4 is cooled by convection with the surrounding air, which is at ambient temperature. Thus, the glass pipe is much cooler than the heated metal tube 1. A refinery installation would require total enclosure of the glass pipe in an approved metal housing, within which air circulation could be maintained by a motor-operated blower.

During operation of the analyzing apparatus, low boiling materials normally present in a gasoline (which are boiled off or vaporized from the plate members at the upper end of tube 1, and which would ordinarily travel as vapor up tube 12) are condensed by heat exchange with water, in the condenser or water jacket 15. Since the upper end of tube 12 is open to the atmosphere, low boiling materials might tend to escape out this tube; however, the condenser 15 prevents the escape of any substantial amount of the hydrocarbons normally encountered in a sample. Distillate which is condensed at condenser 15 finds its way, as liquid, back down tube 12, and thence via the upper ends of tube 1 and of slot 2 to the annular space outside of tube 1; this liquid eventually ends up in the distillate outlet conduit 27.

Figure 7:
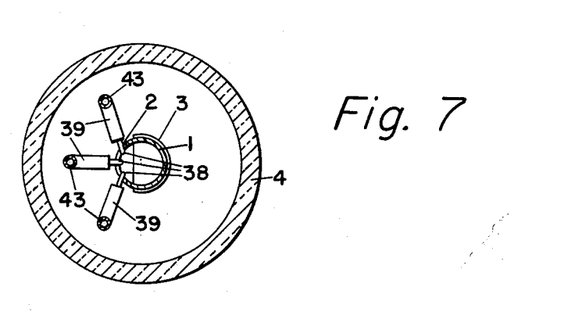
FIG. 7 is a transverse section taken along line 7—7 of FIG. 1.

Three thermocouples 38 (see FIG. 7) are provided, for sensing the temperature of the vapors distilled from the fins within the heated tube 1. Each of the thermocouples is cemented into the upper end of a respective thermocouple well 39 (e.g., a length of metal tubing) which passes downwardly through a respective aperture 40 in the lower flange 6 (only one such aperture being shown in the FIG. 1 sectional view). The thermocouple wells 39 are electrically insulated from the lower flange 6 by inserts or sleeves (not shown) of insulating material (for example, the tetrafluoroethylene resin known as "Teflon"). These sleeves are fixedly mounted within respective oversize tubing connectors 41 which are in turn threadedly mounted in the respective apertures 40, and the thermocouple wells 39 are mounted for sliding movement through the central bores of the respective insulating sleeves. As illustrated in FIG. 5, the centers of the three wells 39, and of the three connectors 41 (as well as of the three apertures 40, of course) are located on a circle which is concentric with the axis of tubes 1 and 18. The three thermocouple wells are spaced angularly around this circle.

The electrical leads 42 for each thermocouple 38 extend downwardly through the respective thermocouple well 39, and these leads (of which there are three sets, one set for each of the three thermocouples) are connected to a suitable multipoint temperature recorder. In this way, the temperatures sensed by each of the three thermocouples may be simultaneously recorded.

All of the thermocouple wells 39 are disposed on the front side of tube 1 (that is, on the slot-side of this tube). The upper end of each thermocouple well is bent over (see FIGS. 1 and 7) to a position such that the thermocouples 38 themselves (which, as previously stated, are fixed at the extreme upper ends of the respective wells) extend through slot 2 to points inside tube 1 and closely adjacent the front ends of the fins 3. The thermocouples 38 therefore can sense the temperature of the vapors distilled from the fins within the heated tube 1.

The thermocouples 38 are arranged to traverse the entire length of the tube 1. That is to say, they are mounted for separate and individual adjustment longitudinally of tube 1. To this end, an elongated guide member 43 (which may be either a tube or a rod) is rigidily secured (as by brazing) to each respective thermocouple well 39 at its region of bending, the guide rod being aligned with, and in effect serving as a continuation of, the straight portion of its respective well 39. One of these guide rods 43 is illustrated in FIG. 1. Each of the three guide rods serves as a continuation of its respective thermocouple well upwardly, being secured to its respective well near the upper end of the well. Each of the three guide rods 43 (which may for example be made of stainless steel) extends upwardly, passing through a respective aperture 44 in the upper flange 5. The guide rods 43 are electrically insulated from the upper flange 5 by inserts or sleeves (not shown) of insulating material such as "Teflon." These sleeves are fixedly mounted within respective oversize tubing connectors 45 which are in turn threadedly mounted in the respective apertures 44, and the guide rods 43 are mounted for sliding movement through the central bores of the respective insulating sleeves. As illustrated in FIG. 4, the centers of the three guide rods 43, and of the three connectors 45 (as well as of the three apertures 44, of course) are longitudinally aligned with the centers of the respective wells 39 and the respective connectors 41 at the bottom end of the assembly (see also FIG. 5). Each of the three thermocouple assemblies 38, 39, 42, 43 may thus be manually (and independently) slid along or adjusted longitudinally of tube 1, to position the respective thermocouple 38 at or adjacent any particular selected one of the plates 3 or 3'. The thermocouples, being movable manually along tube 2, may be thought of as probes.

As previously described, three tabs 11 protrude or extend from the back of the heated tube 1, at the twelfth, twenty-third, and thirty-fourth fins, counting from the upper end of the tube. A separate braided wire conductor 46 (one of which is illustrated in FIG. 1, the other two being omitted for purposes of clarity) is attached to each respective tab 11. These braided wire conductors extend upwardly, and the other end of each such conductor is attached to a respective stud 47. Studs 47 are threadedly mounted within and extend through respective sleeves 48 of electrical insulating material such as "Teflon," which sleeves are in turn threadedly mounted in suitable apertures provided in the upper flange 5. Studs 47 are thus electrically insulated from the flange 5. By means of nuts such as 49, electrical conductors such as 50 may be attached and electrically connected to each respective one of the studs 47. As illustrated in FIG. 4, the centers of the three studs 47, and of the three sleeves 48, are located on a circle which is preferably the same circle as that on which are located the centers of the guide rods 43. The three studs are spaced angularly arounr this circle.

The arrangement just described, including the three tabs 11 and the three conductors 46 and the three conductors 50, in effect divides the tube 1 into four sections (when considered along with conductors 29 and 31). This arrangement permits impressing different voltages across the various tube sections, in order to effect different heat inputs to the sections, as may be required by the character of the sample stream to be distilled or analyzed. In other words, by this arrangement a non-uniform heat input may be applied to the tube. For example, referring again to FIG. 6, several saturable reactors could be controlled by the controller 33, the controlled windings of these reactors being connected separately to the various tube sections, by way of conductors 29, 50, etc.

The multistage analyzing apparatus of this invention is calibrated by feeding to it a standard sample, of approximately the same boiling range as the stream to be analyzed. Typical laboratory (ASTM) distillations of two hydrocarbon mixtures used as standards are reported in Table I.

*Table I*

|  | Gasoline | Naphtha |
|---|---|---|
| Initial ° F | 131 | 306 |
| 5% ° F | 163 | 317 |
| 10% ° F | 174 | 320 |
| 20% ° F | 189 | 325 |
| 30% ° F | 202 | 330 |
| 40% ° F | 215 | 335 |
| 50% ° F | 226 | 340 |
| 60% ° F | 238 | 345 |
| 70% ° F | 249 | 352 |
| 80% ° F | 262 | 363 |
| 90% ° F | 280 | 379 |
| 95% ° F | 293 | 404 |
| End Point ° F | 333 | 449 |
| Recovery percent | 98 | 98 |
| Residue do | 1 | 1.5 |

By way of example, it will be assumed that the 10%, 50%, and 90% points of a gasoline stream are to be continuously and simultaneously recorded. The first step is to determine the percentage of distillate which will produce a vapor temperature on the last stage (the lowermost or forty-sixth one of the fins 3) equivalent to the 90% point of the standard, as given in Table I. In practice, the residue drop rate is decreased, by changing the set point of the controller 33, until the last stage (fin No. 46) reads 280° F., the 90% point of the gasoline standard. If a naphtha standard were applied to the device, this temperature reading should be 379° F., the 90% point of the naphtha standard. Of course, for this temperature reading the lower thermocouple probe 38 would be adjusted to a position such as to sense the vapor temperature at the lowermost fin or stage.

For test purposes, the residue drop rate may be varied and a series of readings taken of the drop rate and the corresponding temperature, in degrees Fahrenheit, of the vapor temperature on the last or lowermost stage (stage No. 46). Since the feed rate is known (it is set by adjustment of pump 32 to a certain value), the drop-rate readings may readily be converted to volume precent distilled values. Then, a curve may be drawn, plotting the last-stage temperature readings against the volume percent distilled values. This has been done, and it was found that for a stage No. 46 temperature of 280° (with the gasoline standard) the volume percent distilled was 95.7; for a stage No. 46 temperature of 379° (with the naphtha standard) the volume percent distilled was 98.0.

Next (continuing with the calibration), the middle and top thermocouple probes 38 are moved to locate the stages which have temperatures as close as possible to the 50% point and the 10% point, respectively (as given in Table I). This completes the calibration.

For use, the feed is switched over to the stream to be analyzed, with the setting of controller 33 unchanged. Then, the heat input to the tube 1 will be automatically varied (by the action of the detection and control circuit 37, 33, etc., as previously described) to maintain a fixed residue rate (i.e., a fixed drop rate in drop counter 35), and the thermocouple probe temperatures will reflect changes in the boiling points of the stream being analyzed.

It is pointed out that the greater the number of stages in tube 1 (i.e., the greater the number of fins or plate members therein), the smaller will be the temperature difference between adjacent stages, as sensed by the thermocouple probes. However, there should be an upper limit on the number of stages, so that tube 1 does not become inordinately long. It has been found that the use of forty-six stages, as disclosed herein, satisfies both of these requirements.

Some thought must be given to the feed rate, as established by pump 32. If the feed rate is too low, the plate members or fins will tend to become dry, which is undesirable. On the other hand, if the feed rate is too high, ripples tend to develop, giving a non-uniform flow, which is also undesirable.

In Table II, following, there is given, by way of example, typical operating information for the analyzer of this invention, when operating on the gasoline and naphtha standards hereinabove referred to.

*Table II*

|  | Gasoline | Naphtha |
|---|---|---|
| Overall tube resistance, ohms | .052 | .052 |
| Average overall voltage, volts | 2.95 | 3.60 |
| Feed Rate, cc./min | 26.0 | 24.6 |
| Distillate, volume percent | 95.7 | 98.0 |
| Stage number, 90% point | 46 | 46 |
| Recorder Reading, ° F | 280 | 378 |
| Correction, 90% point, ° F | 0 | +1 |
| Stage number, 50% point | 34 | 39 |
| Recorder Reading, ° F | 226 | 340 |
| Correction, 50% point, ° F | 0 | 0 |
| Stage number, 10% point | 15 | 30 |
| Recorder Reading, ° F | 173 | 319 |
| Correction, 10% point, ° F | +1 | +1 |

In the above table, as throughout the present description, the stage numbers are with reference to a consecutive numbering scheme, beginning at the topmost or uppermost stage.

Figure 8:
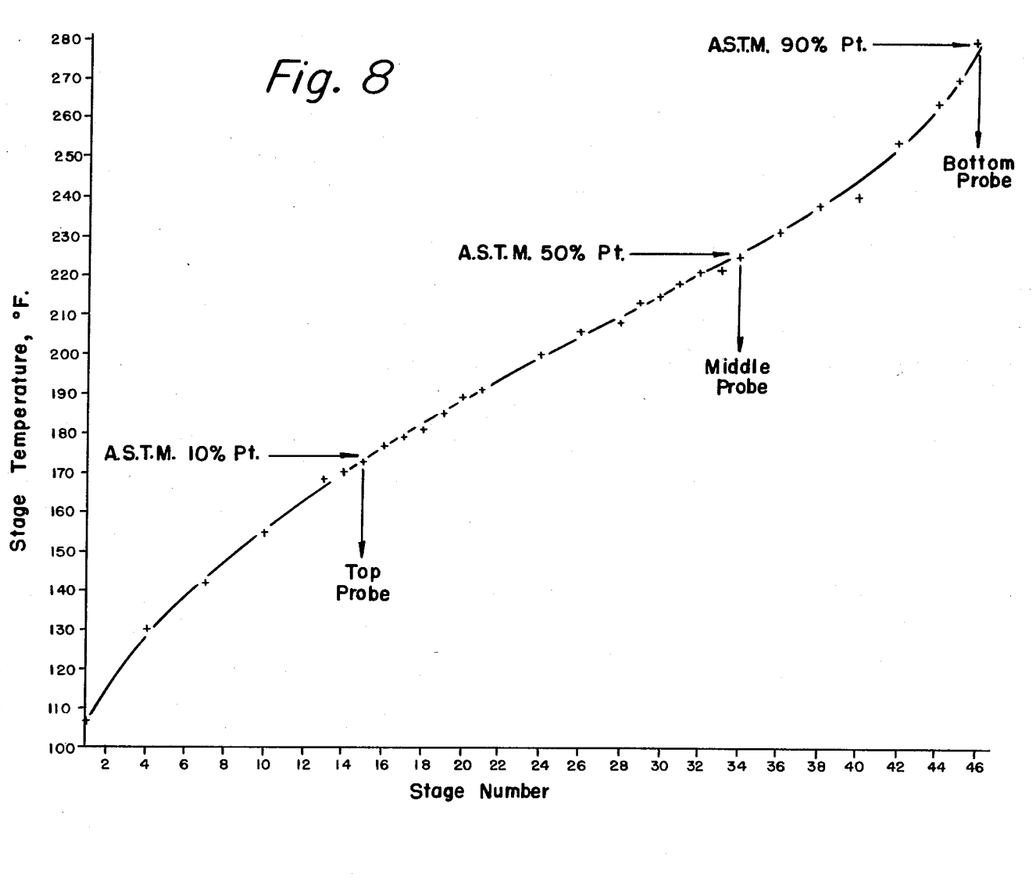
FIGS. 8 and 9 are temperature profiles of certain samples, taken with the apparatus of the invention.
Figure 9:
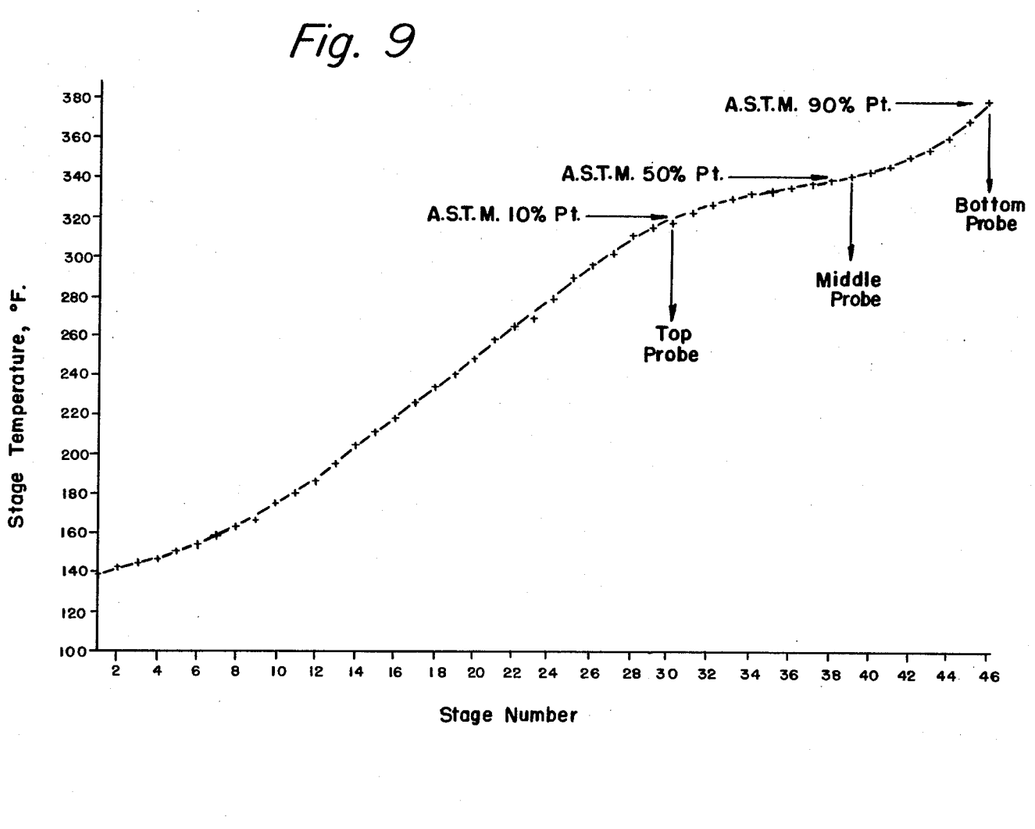

FIG. 8 shows a tempreature profile, obtained with the apparatus of this invention, on a gasoline standard. For this profile, temperature readings represented by the various test points were obtained by moving the thermocouple probes to the indicated fins or stages, and reading the corresponding temperatures on the temperature recorder. For this figure, the voltages applied to each section of the tube 1 were equal; that is to say, no special use was made of tabs 11 and conductors 50, etc. In FIG. 8, there are also indicated the positions of the top, middle and bottom probes for recording simultaneously the 10%, 50%, and 90% points, respectively, of the gasoline stream; the data for these three points correspond to those given in Table II above FIG. 9 is a temperature profile similar to FIG. 8, but on a naphtha standard. Again, the voltages applied to each section of the tube 1 were equal. In FIG. 9, there are indicated the positions of the top, middle, and bottom probes for simultaneously recording the 10%, 50%, and 90% points, respectively, of the naphtha stream; the data for these three points corresponds to those given in Table II above. Reference to the naphtha profile of FIG. 9 shows that a considerable portion of the tube 1 was used merely to preheat the sample, before boiling began. That is to say, the initial boiling point of 306° F. for naphtha (see Table I) is not reached until beyond stage No. 27, and the 10% point is not reached until stage No. 30. For naphtha, better use could be made of the tube by impressing more voltages across the top section thereof, thereby heating to the 10% point with fewer stages. This could be done by making appropriate use of the tabs 11 and conductors 50, etc., in the manner previously described.

To determine the speed of response of the apparatus of the invention, several time-temperature records were taken of stage No. 30, at a sample feed rate of approximately 25 cc./min. When the heat was turned on (that is, when the voltage was applied to tube 1), about four minutes was required to "line out" at recording temperature.

When a switch was made from a gasoline sample to a naphtha sample, approximately 1.5 minutes was required to reach 63.2% of the ultimate temperature change. When a switch was made from a naphtha sample to a gasoline sample, approximately 3.5 minutes was required to reach 63.2% of the ultimate temperature change. In these last-mentioned cases, the figure of 63.2% relates to the first order time constant for a transient, which time constant is, of course, the time required to reach 63.2% of the ultimate change embodied in the transient.

The invention claimed is:

1. In a continuous distillation analyzer, an elongated tube mounted with its longitudinal axis extending substantially vertically, means for feeding a liquid stream to be analyzed into the upper end of said tube, a plurality of spaced plate members positioned in said tube in such a manner that the liquid flowing downwardly through said tube will contact such members one at a time in succession, means for heating said tube and said members to an elevated temperature, a relatively cool pipe surrounding but spaced from said tube, for condensing vapors emanating from said tube, means for abstracting liquid residue from the lower end of said tube, and a temperature-sensing element positioned adjacent said tube and mounted for adjustment longitudinally of said tube, thereby to sense the vapor temperature at a selected one of said members.

2. Combination as defined in claim 1, characterized in that said tube has an elongated slot therein for the passage of vapor outwardly from said tube, and also in that said element in position in registry with said slot.

3. Combination as defined in claim 1, characterized in that said tube is metallic, and also in that said heating means comprises a source of electrical current connected between the ends of said tube.

4. Combination as set forth in claim 1, including also means responsive to the rate of flow of the liquid residue for controlling said heating means in such a way as to maintain the residue flow rate substantially constant.

5. Combination as defined in claim 1, characterized in that said feeding means operates to continuously feed the liquid stream into said tube at a constant, predetermined rate.

6. Combination as set forth in claim 1, wherein said tube is metallic, and wherein said heating means comprises a source of electrical current connected between the ends of said tube; said combination including also means responsive to the rate of flow of the liquid residue for controlling the current output of said source in such a way as to maintain the residue flow rate substantially constant.

7. Combination as set forth in claim 1, wherein said feeding means operates to continuously feed the liquid stream into said tube at a constant, predetermined rate; said combination including also means responsive to the rate of flow of the liquid residue for controlling said heating means in such a way as to maintain the residue flow rate substantially constant, the residue flow rate being small compared to the feed rate.

8. In a continuous distillation analyzer, an inner elongated tube mounted within but spaced from an outer pipe, the longitudinal axis of said tube extending substantially vertically, said tube having an elongated slot therein for the passage of vapor outwardly from said tube toward said pipe; means for feeding a liquid stream to be analyzed into the upper end of said tube, a plurality of spaced plate members positioned in said tube in such a manner that the liquid flowing downwardly through said tube will contact such members one at a time in succession, means for heating said tube and said members to an elevated temperature, means for abstracting liquid residue from the lower end of said tube, and means for abstracting, from the space between said tube and said pipe, distillate which has condensed on the inner wall of said pipe.

9. Combination as set forth in claim 8, including also a temperature-sensing element positioned adjacent said tube and mounted for adjustment longitudinally of said tube, thereby to sense the vapor temperature at a selected one of said members.

10. Combination as defined in claim 9, characterized in that said element is positioned in registry with said slot.

11. Combination as set forth in claim 8, including also a plurality of temperature-sensing elements positioned adjacent said tube and mounted for independent adjustment longitudinally of said tube.

12. Combination as defined in claim 11, characterized in that all of said elements are positioned in registry with said slot.

13. Combination as set forth in claim 8, including also means responsive to the rate of flow of the liquid residue for controlling said heating means in such a way as to maintain the residue flow rate substantially constant.

14. Combination as defined in claim 8, characterized in that said tube is metallic, and also in that said heating means comprises a source of electrical current connected between the ends of said tube.

15. Combination as set forth in claim 14, including also means responsive to the rate of flow of the liquid residue for controlling the current output of said source in such a way as to maintain the residue flow rate substantially constant.

16. Combination as defined in claim 8, characterized in that said feeding means operates to feed the liquid stream into said tube at a constant, predetermined rate.

17. Combination as set forth in claim 16, including also means responsive to the rate of flow of the liquid residue for controlling said heating means in such a way as to maintain the residue flow rate substantially constant, the residue flow rate being small compared to the feed rate.

18. In a continuous distillation analyzer, an inner elongated metallic tube mounted coaxially of but spaced from an outer glass pipe, the common longitudinal axis of said tube and pipe extending substantially vertically, said tube having an elongated slot therein for the passage of vapor outwardly from said tube toward said pipe; a plurality of spaced transversely-extending fins secured within said tube in such a manner that a liquid flowing downwardly through said tube will contact such fins one at a time in succession, means for heating said tube and said fins to an elevated temperature, means for feeding a liquid stream to be analyzed into said tube above the uppermost fin, means for abstracting liquid residue from the lower end of said tube, means for abstracting, from the annular space between said tube and said pipe, distillate which has condensed on the inner wall of said pipe, and a temperature-sensing element positioned adjacent said tube in registry with said slot, said element being mounted for adjustment longitudinally of said tube.

References Cited in the file of this patent

UNITED STATES PATENTS

| | | |
|---|---|---|
| 1,307,601 | Saunders | June 24, 1919 |
| 1,632,748 | Parsons et al. | June 14, 1927 |
| 2,299,899 | Houghland | Oct. 27, 1942 |
| 2,843,714 | Stanton | July 15, 1958 |
| 2,915,462 | Salmon | Dec. 1, 1959 |
| 2,967,425 | Kapff et al. | Jan. 10, 1961 |
| 3,049,907 | Rolfson | Aug. 21, 1962 |